United States Patent
Wilson et al.

[11] Patent Number: 6,151,481
[45] Date of Patent: Nov. 21, 2000

[54] COMBINER WITH PHASE AND DELAY CORRECTION

[75] Inventors: Dennis L. Wilson; Frank Chethik, both of Palo Alto, Calif.

[73] Assignee: Lockheed Martin Corporation, Bethesda, Md.

[21] Appl. No.: 09/039,206

[22] Filed: Mar. 13, 1998

[51] Int. Cl.[7] .............................. H04B 7/135; H04B 1/17; H04B 1/06; H04B 10/06
[52] U.S. Cl. ................... 455/13.3; 455/13.3; 455/191.1; 455/242.2; 455/344; 359/191
[58] Field of Search ................................ 359/172, 191, 359/325, 326; 455/273, 275, 276.1, 277.1, 277.2, 278.1, 279.1, 280

[56] References Cited

U.S. PATENT DOCUMENTS

| | | | |
|---|---|---|---|
| 4,752,969 | 6/1988 | Rilling | 455/278 |
| 5,025,485 | 6/1991 | Csongor et al. | 455/273 |
| 5,263,180 | 11/1993 | Hirayama et al. | 455/273 |
| 5,761,613 | 6/1998 | Saunders et al. | 455/137 |
| 5,933,466 | 3/1999 | Oshima et al. | 375/347 |

*Primary Examiner*—Daniel S. Hunter
*Assistant Examiner*—Meless Zewdu
*Attorney, Agent, or Firm*—Kenneth W. Float

[57] ABSTRACT

A combining technique for coherently combining signals transmitted from a moving satellite that are received by separate antennas. The combining technique corrects for differential delays that are large enough to cause misalignments in the symbols of the communication signal as well as the phase of the signal. Further the combining technique tracks changes in the differential delay, keeping the phase and the symbols properly aligned for combining.

15 Claims, 4 Drawing Sheets

COMBINER WITH PHASE AND DELAY CORRECTION

BACKGROUND

The present invention relates generally to combiners, and more particularly, to a combiner having phase and delay correction that permits combining of signals received from a moving satellite using two or more antennas.

When the communication frequencies and the symbol rates are low, the combining of the output of two separate antennas to improve the signal to noise ratio is a problem that was solved many years ago. The solution to this problem is discussed in an article by D. G. Brennan, entitled Linear Diversity Combining Techniques, Proc. of the IRE, Vol. 47, No. 6, pp. 1075–1102, June 1959. The optimal solution is to combine the signals from separate antennas by weighting the signals according to their signal to noise ratio and then add the signals. The signals must be added in phase, so the first adjustment is to correct the phase of the antennas such that all of the signals are in phase.

Referring to the drawing figures, FIG. 1 shows the basic concept of the combining process. The combining process adjusts the gain for each of the antennas depending on the signal to noise ratio at the respective antenna, shifts the phase so that all of the signals are in phase and adds the signals to provide the input to the receiver.

When like antennas are closely spaced such that inter-arrival delays are much less than a received symbol period, the signal to noise ratio is the same at each of the antennas, so the combining process is one that applies a phase shift to each signal such that the signals combine in phase.

When the received signal is from a fixed source, the phase adjustment for combining is constant and can be built into circuits of the combiner. Such a circuit that has a constant bandpass, but a phase shift that depends on the components of the circuit, is well known in the art.

As satellite communication became more established, the possibility of moving sources were taken into account. The phase adjustment of the combiner was made variable by using phase locked loop technology to adjust the phase of oscillators used in downconverters to correct for the phase errors of each of the signals from the antennas.

As the frequencies of communication with satellites increase and the symbol rates increase, the previous solutions are no longer adequate. Antennas that were previously considered to be close together become effectively farther apart as the wavelength decreases and the data rate increases. A primary difficulty is that of aligning signals such that the communication symbols are aligned as well as the phase of the signals.

FIG. 2 illustrates the change in differences in satellite range from two different points on the Earth as a satellite moves. In particular, as the satellite moves, differences in range to the ground terminals changes. A satellite that moves one degree at geosynchronous altitude causes a change in path length at the latitude of the United States of nearly 50 miles. Two antennas that are 10 miles apart may have a difference in change in path length of 700 feet.

The symbol rates for satellite communication may range from hundreds of megasymbols per second to gigasymbols per second. At one gigasymbol the propagation length of one symbol is approximately one foot. If the signals are not aligned to within a delay of a small fraction of a symbol period, not only must the phase be adjusted, but the relative delay must be adjusted before the signals can be combined.

One technique for adjusting the phase and delay of a signal is to sample each of the signals from the antennas and convert the signals to a digital form. The signal samples from the antennas may be pulled from a buffer, time-aligned, interpolating between samples if necessary to establish the correct timing. The phase of a digital signal may be adjusted by multiplying it by a complex phase shift signal. Typically the signals are converted to baseband before sampling, since the sampling rate to prevent aliasing (which must be higher than twice the highest frequency) can be higher than is practical for RF or IF signals.

Once the communication symbol rate increases to hundreds of MHz or GHz, the option of sampling the signals and performing processing digitally is less attractive. Conversion rates are very high, and after conversion the computation rate required to determine the delay adjustment and the phase shift is very large. After the amount of the delay adjustment and phase shift are determined the hardware required to make the delay adjustment and to correct the phase must be very fast.

The size of the problem is established by considering a typical satellite communication problem. A ground station communicating with a satellite in a nominal geosynchronous orbit that is ten degrees away from the longitude of the ground station will see variations in the distance to the satellite that range nearly 50 miles due to small orbital shifts caused by gravity effects of the moon, planets, and solar wind.

The difference in range to the satellite between two antennas that are spaced 10 miles apart can be as much as 6.8 miles. The change in the difference is approximately 700 feet due to satellite motion. It is the difference in distance to the antennas that must be taken into account in combining the antenna signals.

For a signal with a symbol rate of one gigasymbol per second, the propagation length of one symbol is approximately one foot. A change of 700 feet changes the received symbol timing between two antennas by 700 symbols, which is a large number of symbols. At two gigasymbols the difference in received symbol timing varies 1400 symbols, which is a very large number. Even for a symbol rate of 100 megasymbols per second, the difference in the number of symbols between the two antennas varies by 70 symbols. Thus the adjustment of the symbol timing between the antennas must cover 70 to 1400 symbols or more depending on the symbol rate of the communication signal.

There is also a fixed delay that must be taken into account. The signal must be transferred from the antennas to the combining network, introducing a fixed delay that adds to the minimum delay difference between the signals at the antennas. The variable delay must be added to the fixed delays to correct the timing of the antenna signals.

Thus, from the above, when two or more antennas are used to receive a signal from a moving satellite, previous technology is not adequate to combine the signals. Accordingly, it is an objective of the present invention to provide for a combiner having phase and delay correction that permits combining of signals received from a moving satellite using two or more antennas. It is a further objective of the present invention to provide for an improved combiner that employs an optical variable delay.

SUMMARY OF THE INVENTION

To accomplish the above and other objectives, the present invention provides for apparatus and methods that implement a combining technique for combining signals to produce phase and delay adjustments that coherently combine signals received at separate antennas. The present combining technique corrects for differential delays that are large enough to cause misalignments in the symbols of the communication signal as well as the phase of the signal. Furthermore, the present combining technique tracks changes in the differential delay, keeping the phase and the symbols properly aligned for combining.

The apparatus of the present invention comprises a variable delay circuit. The variable delay circuit comprises an optical modulator that receives a radio frequency (RF) or intermediate frequency (IF) signal that is to be delayed. A laser is used to modulate the RF/IF signal to produce a modulated light signal. The modulated light signal is applied to an optical delay circuit that comprises an optical switch that can switch the modulated light signal to a plurality of outputs. The outputs are coupled to respective optical fibers that have different lengths, and thus provide for different delays. The optical fibers are coupled to a optical combiner that combines the signals from the respective optical fibers into a single optical signal that is output by the optical delay circuit. A plurality of such optical delay circuits may be cascaded together to provide multiple different delays that permit finer delay resolution. An optical detector processes the combined single optical signal to produce a delayed RF/IF signal.

The variable delay circuit may be used to form a combiner that inserts delays that match a received signal from an antenna with a reference signal from another antenna. A delay discriminator determines whether the received signal is early or late compared to the reference signal and controls the delays that are inserted by the variable delay circuit. Phase processing circuitry measures the phase error between the delayed received signal and the reference signal and for adjusting the phase of the received signal to remove the phase error. Combiner circuitry combines the delayed received signal with the reference signal to form a composite signal that may be demodulated. One embodiment of the present method comprises steps performed in the respective combiner elements.

A baseband delay unit may be implemented using the combining technique of the present invention. The baseband delay unit comprises a receiver that generates an IF signal from a signal received from an antenna. The signal is converted to a complex baseband signal by downconversion using a first mixer and an oscillator, generating an in-phase and a quadrature component (I, Q) of the IF signal. These signals are passed through the variable delay circuit and are processed by a detector where they are reconverted to IF at the output using a second mixer that is coupled to the outputs of the detector and the oscillator. This produces a delayed IF output signal from the baseband delay unit.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
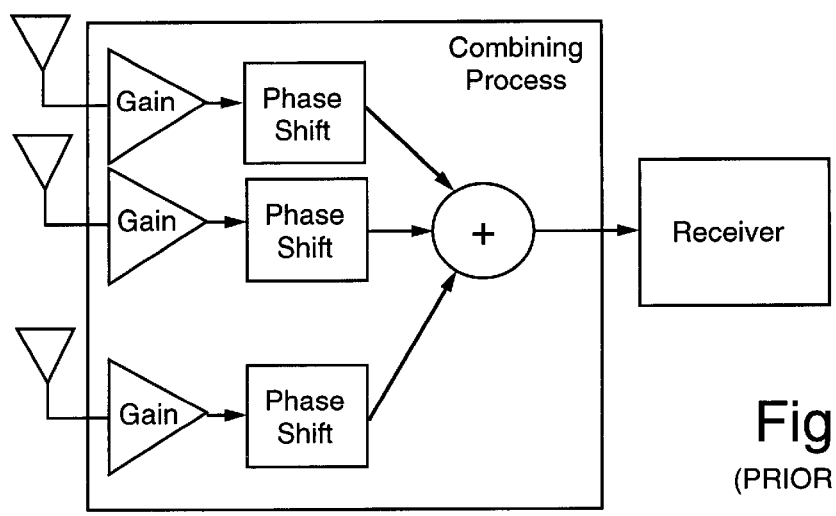
FIG. 1 illustrates the basic concept of combining signals from multiple antennas.
Figure 2:
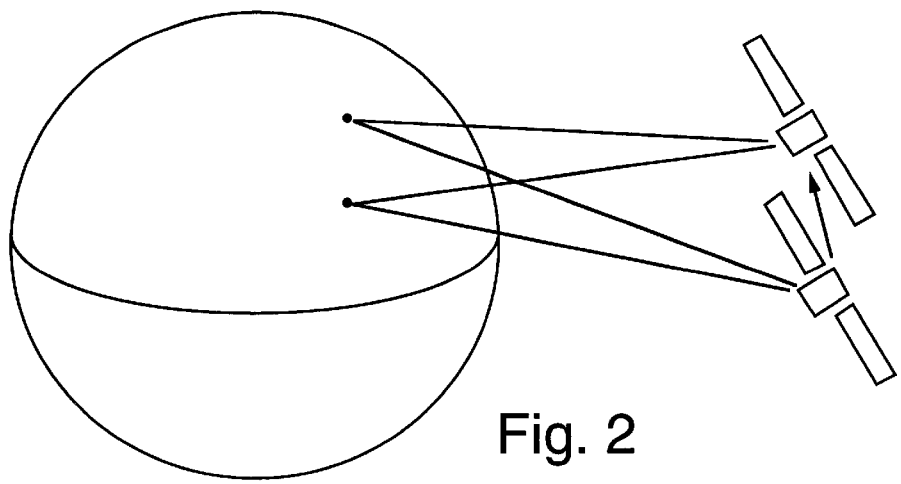
FIG. 2 illustrates the change in differences of satellite range from two different points on the Earth as a satellite moves.
Figure 3:
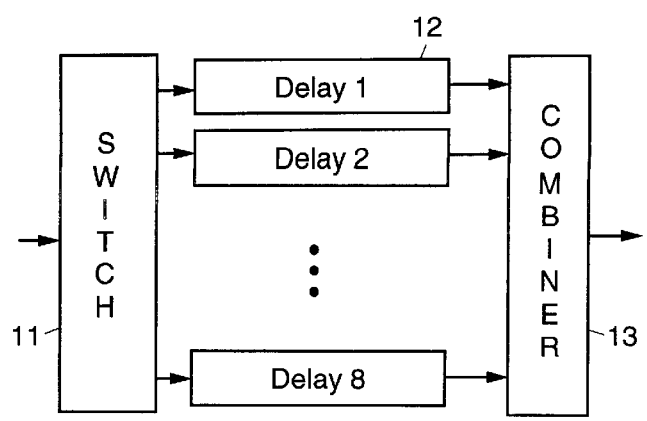
FIG. 3 illustrates a circuit for introducing delays that may be changed, and that may be employed in the present invention to provide delay correction.

Referring again to the drawing figures, the present invention provides for a combiner 40 (FIG. 6) having phase and delay adjustment, that provides for coherent combining of signals received at separate antennas. The combiner 40 uses an optical (switched fiber) variable delay 10 (FIG. 3), for example. Referring to FIG. 3, it shows an exemplary optical variable delay 10 which comprises a switch circuit 10 for introducing switched delays 12 that may be changed. The switch circuit 10 shown in FIG. 3 uses an optical switch 11 to introduce delays 12 arranged in steps. The optical switch 11 may be a BeamBox™ manufactured by AKZO NOBEL, for example. This optical switch 11 is available in 1:2, 1:4, and 1:8 switch combinations. The delays 12 are produced using different lengths of single mode optical fiber connected to the optical switch 11. An optical fiber combiner 13 is coupled to each of the outputs of the optical switch 11. The optical fiber combiner 13 is an optical unit incorporating multiple optical fibers and operates in the manner of an optical splitter, except in reverse.

Figure 4:
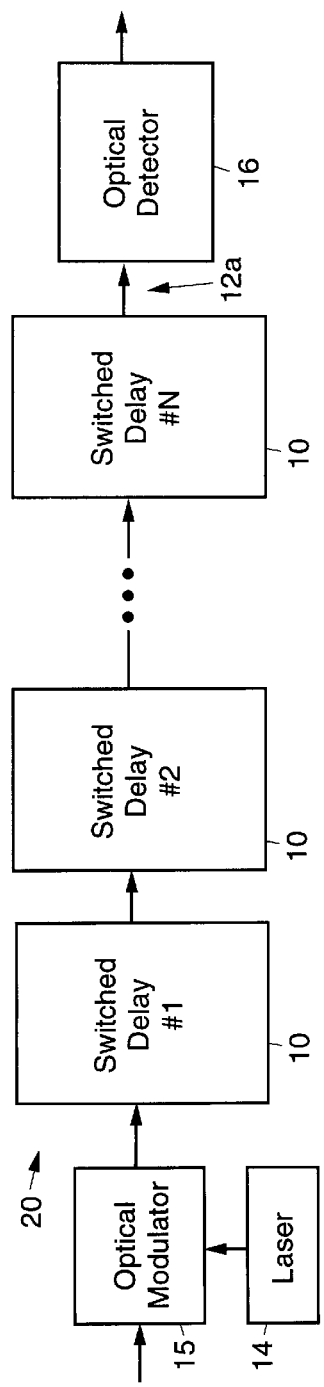
FIG. 4 illustrates the concept of concatenating switching stages.

FIG. 4 shows the concept of concatenating switching stages (multiple cascaded switch circuits 10) that provides for a stepped variable delay circuit 20. As is shown in FIG. 4, a number of switch circuits 10 can be used to produce a variable delay 12a that has a large range with fine resolution. The stepped variable delay circuit 20 of FIG. 4 operates by introducing a signal from a laser 14 which is modulated in an optical modulator 15 by a signal that is to be delayed. The laser 14 is used to generate enough power to overcome the switching loss through several stages of switching (the multiple cascaded switch circuits 10). A 1:8 switch 11 has a switch loss of approximately 5 dB. The laser 14 is able to supply enough power to pass through several stages of switching without amplification. The switch circuits 10 may be used in stages having different lengths of fiber employed in each stage to provide for a stepped variable delay 12a at the output of the stepped variable delay circuit 20. The output of the stepped variable delay circuit 20 is coupled to an optical detector 16.

Table 1 shows a possible set of values for the delays measured in feet through six cascaded stages of switching. By setting the switch 11 at each of the stages appropriately, any delay can be achieved from a shortest delay of 1,146.281 feet through more than 9000 feet with a resolution of 0.031 feet, about 0.4 inches. By using an additional stage, the resolution can be finer.

TABLE 1

|  | #1 | #2 | #3 | #4 | #5 | #6 |
| --- | --- | --- | --- | --- | --- | --- |
| Δ1 | 8K | 1024 | 128 | 16 | 2.0 | 0.25 |
| Δ2 | 7K | 896 | 112 | 14 | 1.75 | 0.219 |

TABLE 1-continued

|  | #1 | #2 | #3 | #4 | #5 | #6 |
|---|---|---|---|---|---|---|
| Δ3 | 6K | 768 | 96 | 12 | 1.5 | 0.188 |
| Δ4 | 5K | 640 | 80 | 10 | 1.25 | 0.156 |
| Δ5 | 4K | 512 | 64 | 8 | 1.0 | 0.125 |
| Δ6 | 3K | 384 | 48 | 6 | 0.75 | 0.093 |
| Δ7 | 2K | 256 | 32 | 4 | 0.5 | 0.063 |
| Δ8 | 1K | 128 | 16 | 2 | 0.25 | 0.031 |

The switch circuit 10 of FIG. 3 may be adapted to convey a baseband signal in-phase and quadrature component simultaneously with matched delay 12 by using two lasers 14 that operate at two different optical frequencies. The outputs of the lasers 14 are combined into one fiber for transmission through the switch circuit 10. At the output of the switch circuit 10, the fiber is split to drive optical receivers (not shown) at the two different frequencies. The result can be signals that are matched in delay to a very fine tolerance on the order of $\frac{1}{100}$ inch by controlling the total length of optical fiber from the laser 14 to the fiber combiner 13 and from the splitter to the detectors. The other delays 12 will be exactly matched since the two signals pass through the same fiber limited only by the dispersion in the fiber.

Figure 5:
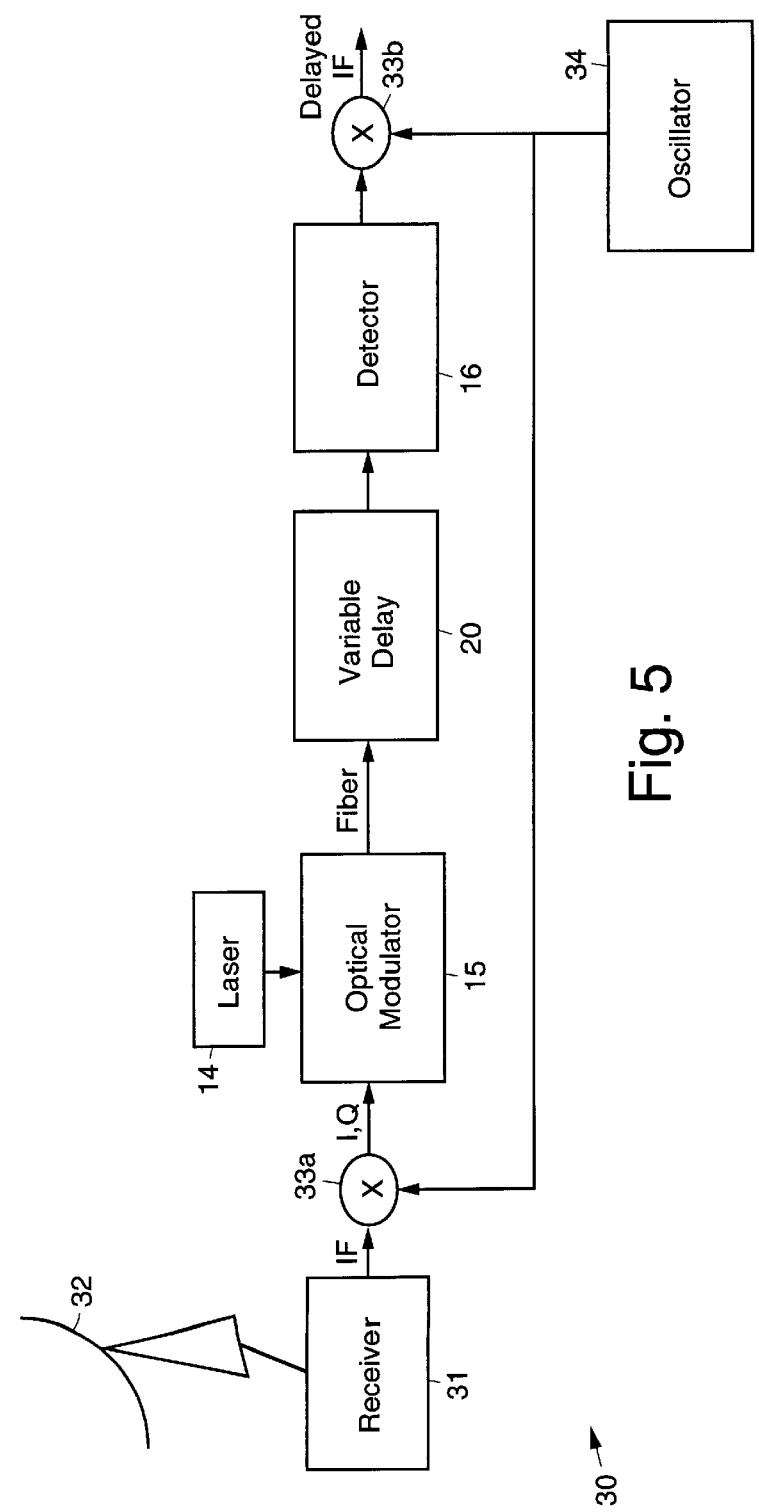
FIG. 5 illustrates the architecture of a baseband delay unit in accordance with the principles of the present invention.

Phase and symbol matching will now be discussed. FIG. 5 shows the architecture of a baseband delay unit 30. FIG. 5 illustrates that the delay at baseband isolates the phase matching and symbol matching processes. A receiver 31 generates an IF signal from a signal received from an antenna 32. The signal is converted to a complex baseband signal by downconversion using a downconverter 33a comprising a first mixer 33a coupled to an oscillator 34, which generates in-phase and quadrature components (I, Q). These signals are modulated using individual lasers 14 and optical modulators operating at different light frequencies. The modulated signals are passed through a variable delay circuit 20 (such as is shown in FIG. 4) and a detector 16 and are upconverted to IF at the output using an upconverter 33b comprising a second mixer 33b that is coupled to the outputs of the detector 16 and the oscillator 34. The oscillator 34 maintains the same frequency in both converters 33a, 33b. This produces a delayed IF output signal from the baseband delay unit 30.

The switching time for the optical switches 11 is 1 millisecond, a time that is many symbols. To make the switching faster, delay increments may be replicated for the last stages, allowing the use of an electronic switch 16a shown in FIG. 6 between the delays that can be as fast as desired. The delay for the example discussed above changes at about 0.6 inches per second. The delay switches approximately once every two seconds for a gigasymbol per second data rate to maintain roughly 0.1 symbol accuracy in the delay. For two gigasymbols per second, the rate is one delay switch per second.

The switching time of the optical switches 11 is equal to many thousands or millions of symbols. Two switched delay assemblies (the stepped variable delay circuits 20 shown in FIG. 6) may be used with a fast switch 11 so that signal continuity is preserved. The switched delay assemblies must be calibrated to each other so that switched delays will be accurate.

The use of the same oscillator 34 at the input of the delay processor (the stepped variable delay circuits 20) and the output of the delay processor guarantees that there is no phase step with the change in the delay. The only change in phase is the drift in phase of the oscillator 34 during the time of the delay. Since the delay that is to be inserted is on the order of 1 microsecond at most, the stability of the oscillator 34 is not critical.

Figure 6:
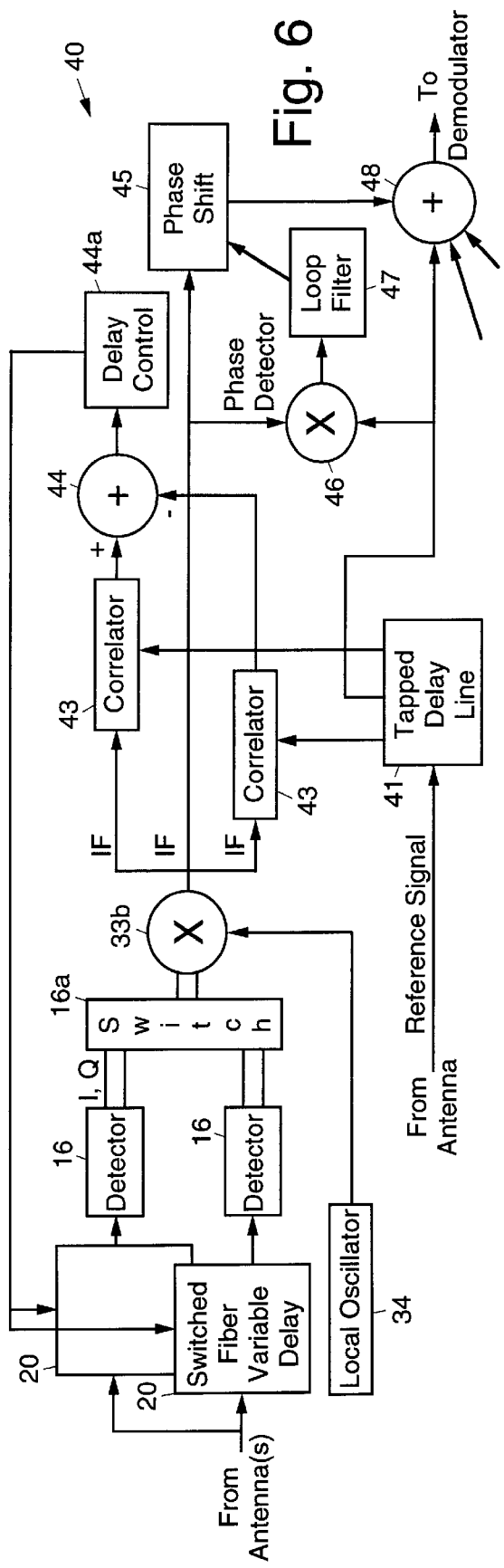
FIG. 6 illustrates a combiner in accordance with present invention.

Combining is accomplished by using a combiner 40 such as is shown in FIG. 6. This combiner 40 combines the phase control and the delay control of the individual components of the signal to produce a signal that is coherently combined in phase and is properly timed for the symbols. As is shown in FIG. 6, the addition of a tapped delay line 41 in the reference signal path provides a reference signal that is ½ symbol before the center tap and a reference signal that is delayed ½ symbol after the center tap to generate relative delays that can be correlated with a reference signal using a plurality of correlators 43 controls the amount of delay. The amount of the delay of the reference signal may be from 0.25 times the length of the symbol to 1 times the length of the symbol. A preferred value is ½ symbol.

The delayed signals derived from the variable delay circuits 20 are processed by a detector 16 followed by the switch 16a to select the delay path, and a mixer 33b that is coupled to an oscillator 34. The mixer 33b generates delayed IF signal outputs, and delayed IF signals from the early and late taps of reference signal tapped delay line 41 are correlated in separate correlators 43. The delayed IF signal output from the mixer 33b is coupled to a phase shift circuit 45 and to a phase detector 46 which also has the reference signal coupled thereto.

Figure 7:
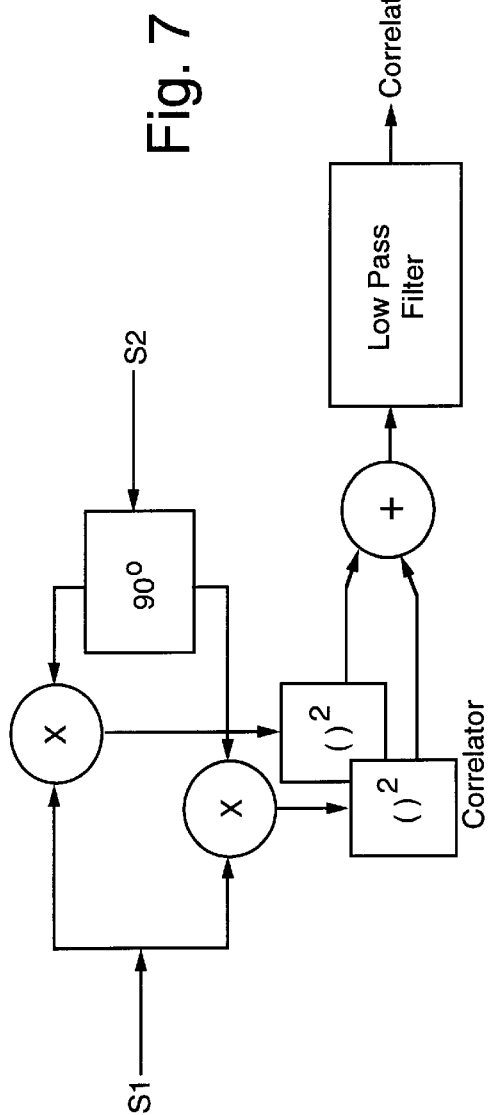
FIG. 7 illustrates the structure of a correlator in accordance with the present invention.

The structure of the correlator 43 is shown in FIG. 7, and is well-known in the art and its construction will not be described. As may be seen from FIG. 7, the output voltage of the correlator 43 is maximum when received signals (S1, S2) applied thereto are perfectly aligned.

Referring again to FIG. 6, the reference signal, one of the received signals, is correlated with the signal to be delayed. The phase is removed from the correlation by using both the in-phase and quadrature components of the reference signal in the correlation. The difference between the two correlation signals, one early and one late, establishes a delay control signal 44a that is used to command the switched fiber variable delay 20 and the switch 16a.

Figure 8:
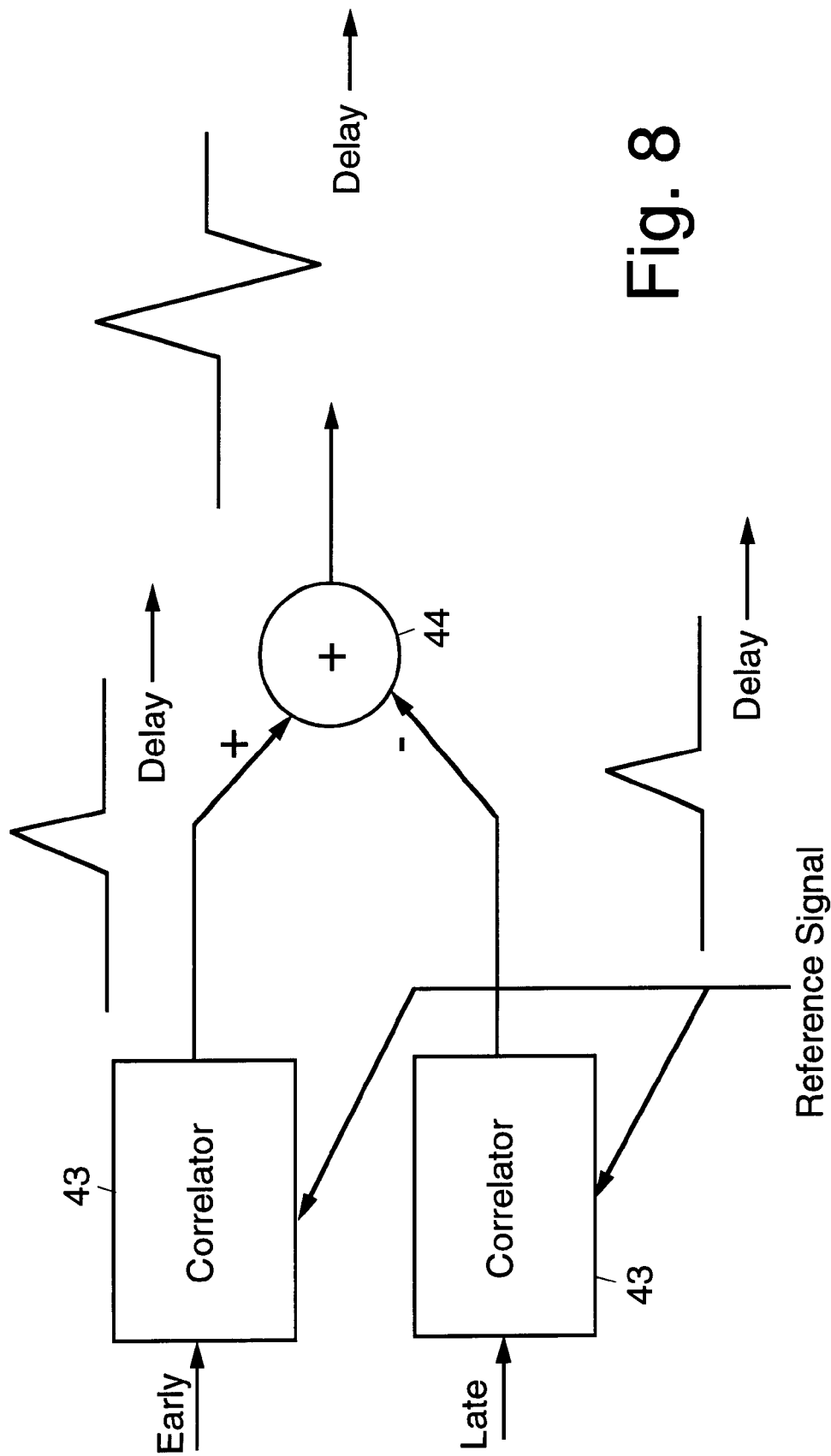
FIG. 8 illustrates the action of two correlators forming a time error discriminator in accordance with the present invention.

FIG. 8 shows the action of two correlators 43 and a combiner 44 which forms a time error discriminator. As is shown in FIG. 8, the correlation peaks as a function of relative delay circuit are offset. One of the correlations peaks early, the second peaks late. The difference forms a time error discriminator. The discriminator determines whether the received signal is early or late compared to the reference signal and controls the delays that are inserted by the variable delay circuit 10. When the time difference between the received signal and the reference signal is zero, the difference between the two time error correlators is zero. When the time difference is different from zero, the difference between the two time error correlators will be different from zero in the direction of the correlator that most closely matches the delay difference.

Referring again to FIG. 6, the received signal which is being delay adjusted may be phase adjusted by a reactance phase modulator 45 with a digitally controlled bias voltage as shown in FIG. 6. The phase may be controlled by using the phase detector 46 to measure the phase difference (phase error) between the reference signal and the delay adjusted signal or may be controlled by measuring the phase difference between the combined signal and the component signal to be adjusted. Alternatively, the phase of the signal for combining may be formed using a numerically controlled oscillator (not shown). The numerically controlled oscillator may be driven from a master oscillator that is distributed to the downconverter at the beginning of the delay. The desired coherence with the input downconverter is maintained, while adding the capability to adjust the phase of the signal into a combiner circuit 48.

The input to the demodulator (not shown) from the combiner circuit 48 is an IF signal that is the coherently combined signal from all of the antennas 32. The demodulator provides for conventional downconversion to baseband I and Q signals, phase tracking to remove the carrier, a symbol locked loop, and demodulation of the signal.

An acquisition phase hunts for the correlation peak in the delay between each of the component antenna outputs and a reference antenna output. Once the correlation peak is being tracked on each of the antennas 32, the phase for each component signal may be adjusted.

Thus, a technique for matching the phase and delay of signals derived from separate antennas 32 has been described. The present invention uses a fiber optic delay technique that is able to change the delay in very short steps over a large range. By providing three short segments of delay to the reference signal, one early, one to be combined in a signal combiner circuit 48, and one late, the switching of the variable delay can be controlled. The delay is performed at complex baseband. The signal through the delay needs to be at a low enough frequency that the phase and the delay of the signal are effectively decoupled, at most a few tenths of a cycle per symbol.

Thus, a combiner having phase and delay correction has been disclosed that permits combining of signals received from a moving satellite using two or more antennas. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A combiner for combining signals received from a moving satellite using a plurality of antennas, said combiner comprising:

a variable delay for inserting delays that matches a received signal from a first antenna with a reference signal from a second antenna;

a delay discriminator for determining whether the received signal is early or late compared to the reference signal and for controlling the delays that are inserted by the variable delay;

phase processing circuitry for measuring the phase error between the delayed received signal and the reference signal and for adjusting the phase of the received signal to remove the phase error; and combiner circuitry for combining the received signal with the reference signal to form a composite signal that is selectively demodulated.

2. The combiner of claim 1 wherein the variable delay comprises:

a downconverter for shifting the received signal to in-phase and quadrature baseband signals;

a pair of optical modulators at different frequencies for changing the in-phase and quadrature baseband signals to signals at optical frequencies;

an optical combiner for combining the outputs of the modulators onto one fiber;

optical switches for routing the signals through different lengths of fiber comprising different delays for the signals;

a pair of optical demodulators for recovering the baseband signals at the output of the variable delay;

an upconverter for shifting the recovered baseband signals to an intermediate frequency; and an oscillator coupled to the downconverter and the upconverter for maintaining the same frequency in both converters.

3. The combiner of claim 1 wherein the delay discriminator comprises:

two correlators for correlating the delayed signal with early and late versions of the reference signal derived from a tapped delay line applied to the reference signal;

a difference circuit for generating the difference between the two correlator signals; and a control for the variable optical delay and for the switch between the two optical delays using the difference between the correlator signals to determine how the optical delay shall be adjusted.

4. The combiner 40 of claim 1 wherein the phase processing circuitry comprises:

a phase detector for receiving the delayed received signal and the reference signal;

a loop filter coupled to an output of the phase detector; and a phase shifter for receiving the delayed received signal and for receiving an output of the loop filter for shifting the phase of the received signal so that it is in-phase with the reference signal.

5. The combiner of claim 1 wherein the combiner circuitry comprises:

an adder for adding delayed and phase-adjusted IF signals output by the phase shifter so that they are in phase and delayed to match the reference signal.

6. A method of combining signals received from a moving satellite using a plurality of antennas, said method comprising the steps of:

inserting delays that will match a received signal from an antenna with a reference signal from another antenna;

determining whether the received signal is early or late compared to the reference signal and controlling the delays that are inserted by the variable delay;

measuring the phase error between the delayed received signal and the reference signal and for adjusting the phase of the received signal to remove the phase error; and combining the received signal with the reference signal to form a composite signal that is selectively demodulated.

7. The method of claim 6 wherein the step of inserting delays comprises the steps of:

shifting the received signal to in-phase and quadrature baseband signals;

changing the in-phase and quadrature baseband signals to optical frequencies for delay through an optical fiber network;

combining the in-phase and quadrature baseband signals so that they are carried by one fiber;

routing the optical frequency signals through a variable delay comprising different length fiber corresponding to different delays for the respective signals;

recovering the baseband signals at the output of the variable delay; and upconverting the signals back to the IF frequency.

8. The method of claim 6 wherein the determining step comprises the steps of:

correlating the delayed signal with early and late versions of the reference signal derived from a tapped delay line applied to the reference signal;

generating the difference between the two correlated signals; and controlling the amount of delay that is inserted using the difference between the correlated signals.

9. The method of claim 6 wherein the measuring step comprises the steps of:

detecting the phase difference between the delayed received signal and the reference signal;

filtering the detected phase difference; and shifting the phase of the delayed received signal so that it is in-phase with the reference signal.

10. The method of claim 6 wherein the combining step comprises the step of:

adding delayed and phase-adjusted IF signals so that they are in phase and delayed to match the reference signal.

11. Apparatus for inserting delays that will match a received signal from an antenna with a reference signal from another antenna, said apparatus comprising:

a downconverter for shifting the received signal to in-phase and quadrature baseband signals;

a pair of light modulators at different light frequencies for changing the in-phase and quadrature baseband signals to light signals at optical frequencies;

a light combiner for combining the outputs of the modulators onto one fiber;

optical switches for routing the light signals through different lengths of fiber comprising different delays for the signals;

a pair of light demodulators for recovering the baseband signals at the output of the variable delay;

an upconverter for shifting the recovered baseband signals back to the IF frequency; and an oscillator coupled to the downconverter and the upconverter to maintain the same frequency in both converters.

12. The apparatus of claim 11 further comprising:

a delay discriminator for determining whether the received signal is early or late compared to the reference signal and for controlling the delays that are inserted by the variable delay;

phase processing circuitry for measuring the phase error between the delayed received signal and the reference signal and for adjusting the phase of the received signal to remove the phase error; and combiner circuitry for combining the received signal with the reference signal to form a composite signal that may be demodulated.

13. The apparatus of claim 12 wherein the delay discriminator comprises:

two correlators for correlating the delayed signal with early and late versions of the reference signal derived from a tapped delay line applied to the reference signal;

a difference circuit for generating the difference between the two correlator signals; and a control for the variable optical delay and for the switch between the two optical delays using the difference between the correlator signals to determine how the optical delay shall be adjusted.

14. The apparatus of claim 12 wherein the phase processing circuitry comprises:

a phase detector for receiving the delayed received signal and the reference signal;

a loop filter coupled to an output of the phase detector; and a phase shifter for receiving the delayed received signal and for receiving an output of the loop filter for shifting the phase of the received signal so that it is in-phase with the reference signal.

15. The apparatus of claim 12 wherein the combiner circuitry comprises:

an adder for adding delayed and phase-adjusted IF signals output by the phase shifter so that they are in phase and delayed to match the reference signal.

* * * * *